United States Patent [19]
Bird

[11] Patent Number: 5,779,211
[45] Date of Patent: Jul. 14, 1998

[54] PERSONAL MOUSE PAD

[76] Inventor: Peter D. Bird, 1637 N. Trelliss Pl., Eagle, Id. 83616

[21] Appl. No.: 771,826

[22] Filed: Dec. 12, 1996

[51] Int. Cl.⁶ .................................................. A47B 91/00
[52] U.S. Cl. ...................... 248/346.01; 224/222; 248/918
[58] Field of Search ........................ 248/346.01, 918, 248/118, 118.3; 108/43; 224/222, 666

[56] References Cited

U.S. PATENT DOCUMENTS

| | | | |
|---|---|---|---|
| 4,494,755 | 1/1985 | Caillouet, Jr. | 273/148 B |
| 4,821,932 | 4/1989 | Petryshyn | 224/222 |
| 4,974,762 | 12/1990 | Boretsky et al. | 224/222 X |
| 4,977,860 | 12/1990 | Harwell | 224/666 X |
| 5,263,423 | 11/1993 | Anderson | 108/43 |
| 5,355,811 | 10/1994 | Brewer | 108/43 |
| 5,388,530 | 2/1995 | Jacobus | 108/43 |
| 5,462,247 | 10/1995 | Aldrich | 248/118 |
| 5,492,298 | 2/1996 | Walker | 248/346.01 |
| 5,593,128 | 1/1997 | Odom et al. | 248/346.07 |
| 5,607,091 | 3/1997 | Musacchia | 224/222 |

*Primary Examiner*—Ramon O. Ramirez
*Attorney, Agent, or Firm*—Frank J. Dykas

[57] ABSTRACT

A portable mouse pad which attaches to the user's leg by means of an elastic strap. This mouse pad allows a computer user to operate a mouse from a variety of positions, including sitting, standing, reclining, with feet propped up, lying on the floor, standing, walking or changing from one of those positions to another of those positions. A mouse holding pocket is built into the portable mouse pad holder. Use of the portable mouse pad at lap level provides a more ergonomically favorable position for mouse use.

17 Claims, 4 Drawing Sheets

PERSONAL MOUSE PAD

BACKGROUND OF THE INVENTION

1. Technical Field

The present invention generally relates to mouse pads for use with a personal computer, and more particularly to portable mouse pads.

2. Background

With the popularity of the graphical user interface in personal computers, the use of a mouse has become an almost universal method of inputting data into a personal computer. A mouse is an electronic device which the user moves across a flat surface to move a corresponding cursor on the screen. The flat surface can be any surface which provides sufficient grip for the ball which extends from the bottom surface of the mouse, but typically a specially made mouse pad is used whose top surface is covered by a fabric. In an office or desktop environment, the mouse pad is typically placed on the surface of the desk and the user moves the mouse on the mouse pad. There are some situations, however, when the user may wish to operate the mouse on some surface other than a desktop. In a relaxed environment such as in the computer user's home, the computer user may wish to lean back in a chair, recline, put his feet up on the desk, lie on the floor, or get up, move around, then resume using the mouse.

Keyboards, the other standard means of inputting data into the computer, are provided with a way to provide some flexibility to the user. Since the keyboard is attached to the computer with flexible cable, the user can easily put the keyboard in his lap, push his chair back, and put his feet up on the desk while continuing to use the keyboard and inputting data into the computer. He can also recline, work from a standing position, lay on the floor with a pillow under his head, and continue to use the keyboard. Some keyboards are fitted with cordless means of communicating with the computer, which further facilitate flexibility and use.

Mouse pads are also available which mount on places other than the desktop alongside the computer. Mouse pads are available which are supported by the user's legs, or which attach to the arm of a chair. While these devices provide improved flexibility in the use of a mouse, their flexibility is limited.

What is needed is a mouse pad which provides enhanced flexibility in the use of a mouse by its user. This flexibility could include being suitable for use when the user is reclining, has his feet up on the desk, is in a reclining position, a standing position, and moving from one of these positions to another position.

A further need is a portable mouse pad which does not need to be lifted, moved and readjusted every time the user moves from one position to another.

An additional object is to provide a mouse pad which allows the user to use a mouse in a position lower than the level of a desktop, for improved ergonomics. A further object is to provide a mouse pad which is attached to, not merely resting on, the user's leg.

A further object is to provide a mouse pad to which other input devices, such as joysticks, can be attached so that they can be used in a variety of positions.

Additional objects, advantages and novel features of the invention will be set forth in part in the description which follows, and in part will become apparent to those skilled in the art upon examination of the following, or may be learned by practice of the invention. The objects and advantages of the invention are realized and attained by means of the instrumentalities and combination particularly pointed out in the appended claims.

DISCLOSURE OF INVENTION

According to the present invention, the foregoing and other objects and advantages are attained by a portable leg-mounted mouse pad for use with a computer mouse and for attachment to a leg of a computer user which includes: a pad surface which has a top surface. The pad surface is attached to a rigid board by one of a number of means of attachment. The rigid board is provided to provide rigidity and support for a flexible pad surface. If the pad surface itself is rigid, then the pad surface serves the function of a rigid board. Also provided is a way to attach the pad surface with its underlying rigid board to the leg of a computer user. The pad surface and the rigid board are attached to the leg of a computer user so that the top surface of the pad surface is available for use with a mouse when the computer user is in a number of positions. These positions can include sitting, reclining, lying on the floor, sitting at a desk with the user's feet on the desk, or changing from one position to another. The way that the portable leg-mounted mouse pad can be attached to the leg of a computer user is by the use of one or more straps. The strap or straps can consist of a first strap section and a second strap section, each with a first end and a second end. The first strap section and the second strap section can be provided with a way of securing an end of each strap to an end of the other strap. The ends of one strap can be secured to the end of the other strap by means of hook and loop surfaces, hooks and eyelets, buttons and button holes, or any number of conventional means of attachment. The portable leg-mounted mouse pad can also have a joystick or other computer input device mounted to it.

The portable leg-mounted mouse pad can also include a way to store and secure the computer mouse when the mouse is not in use. This storage and securing mechanism can be a pocket which is built into one of the two strap sections and into which a mouse can be placed and be secured. The portable leg-mounted mouse pad can also include a way to store writing tools. The writing tools can include pens, pencils, erasers, rulers or other devices. The means of storing these devices can include loops of fabric built into one or both of the strap sections. The portable leg-mounted mouse pad can also have a mechanism which prevents the portable leg-mounted mouse pad from slipping down the leg of the computer user. Since the human leg is generally tapered from hip to foot, there may be some tendency of a leg-mounted device to slip down a person's leg, especially as the person moves, as in sitting, standing and walking. To prevent such slippage, the portable leg-mounted mouse pad can include a device which engages a pocket, a belt, or the clothing of the user. It can also have a friction surface, which can be an adhesive area, a fish scale region, or other means of increasing friction and preventing slipping. This engagement device may be a hook which loops over a pocket or belt, or it may be a clip, which the user clips on to his clothing. The rigid board of the portable leg-mounted mouse pad can also be removable from the portable leg-mounted mouse pad. In its removable form, the rigid board can serve as a straight edge, or can include a note pad. Other tools could be built into the rigid board, such as a calculator, an electronic dictionary, storage places for office equipment such as scissors, magnifying glass, and/or stapler. The mouse pad can be removed from the rigid board and be used as a conventional desktop mouse pad.

In accordance with another aspect of the invention, the present invention is a portable leg-mounted mouse pad with a pad surface which includes a top surface. The top surface serves as a mouse engaging surface. This aspect of the portable leg-mounted mouse pad includes a mouse engaging surface which is lower than the desk top upon which the computer or computer monitor is mounted. The use of a mouse pad on a lower surface is more ergonomically favorable to the computer user's arm, and results in less muscular tension and strain. Whether the user is sitting in a chair, reclining in a chair, lying on the floor, or sitting, use of a mouse pad mounted to the leg provides an ergonomically favorable position for use of the mouse. The mouse pad includes a means of attaching the pad surface to a rigid board, and a rigid board to which the pad surface is attached. This mouse pad also includes a first strap and a second strap, each with a first end and a second end. A means of attaching the ends of the two straps is provided. This means of attachment can be by hook and loop surfaces, hook and eyelet, buttons and button holes, strap and buckle, or any conventional means of attachment. The means of attachment attaches the portable leg-mounted mouse pad in place on the leg of the computer user when the computer user is in any position, including sitting, standing, reclining, with feet propped up, walking, or changing between any of these positions. This aspect of the invention also includes a pocket for storing a computer mouse. It also includes a way to prevent the mouse pad from slipping down the leg of the computer user. This can be a hook or clamp which engages a pocket, belt, or the clothing of the computer user and prevents the mouse pad from slipping down the leg of the user.

This invention, using a pad surface, a rigid board, and one or more straps, thus provides a mouse pad surface for use with a computer mouse which is independent of the position and movement of a user. It also provides a mouse pad position which is ergonomically favorable to a user. The mouse pad can thus be used in a number of positions and need not be removed or adjusted as the user moves from one position to another.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of modifications in various obvious respects, all without departing from the invention. Accordingly, the drawings and description are to be regarded as illustrative in nature and not as restrictive.

BEST MODE FOR CARRYING OUT INVENTION

Figure 1:
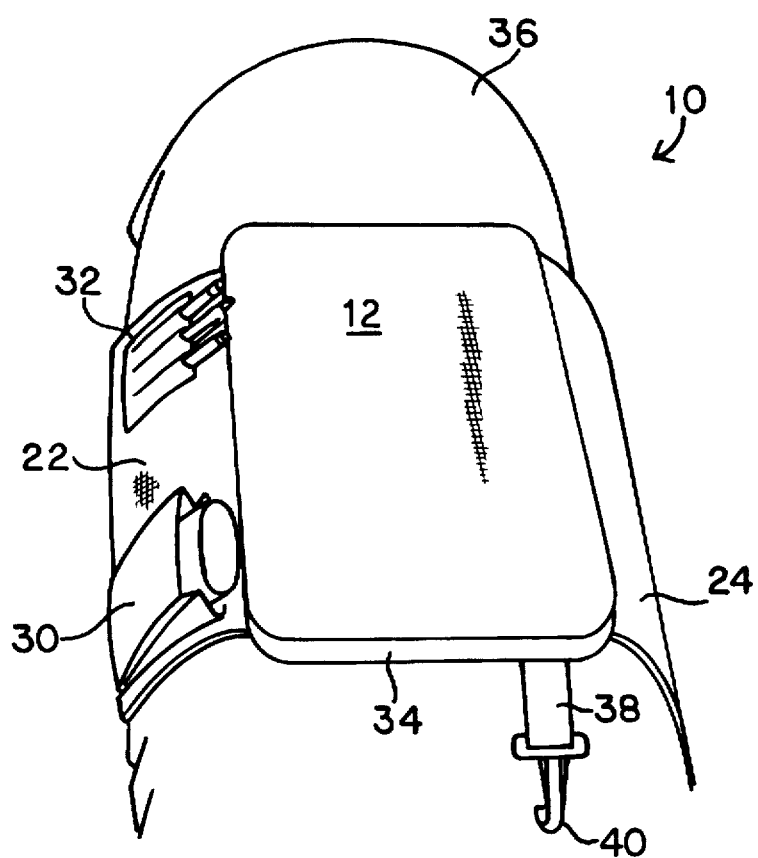
FIG. 1 is a perspective view of the portable leg-mounted mouse pad.
Figure 2:
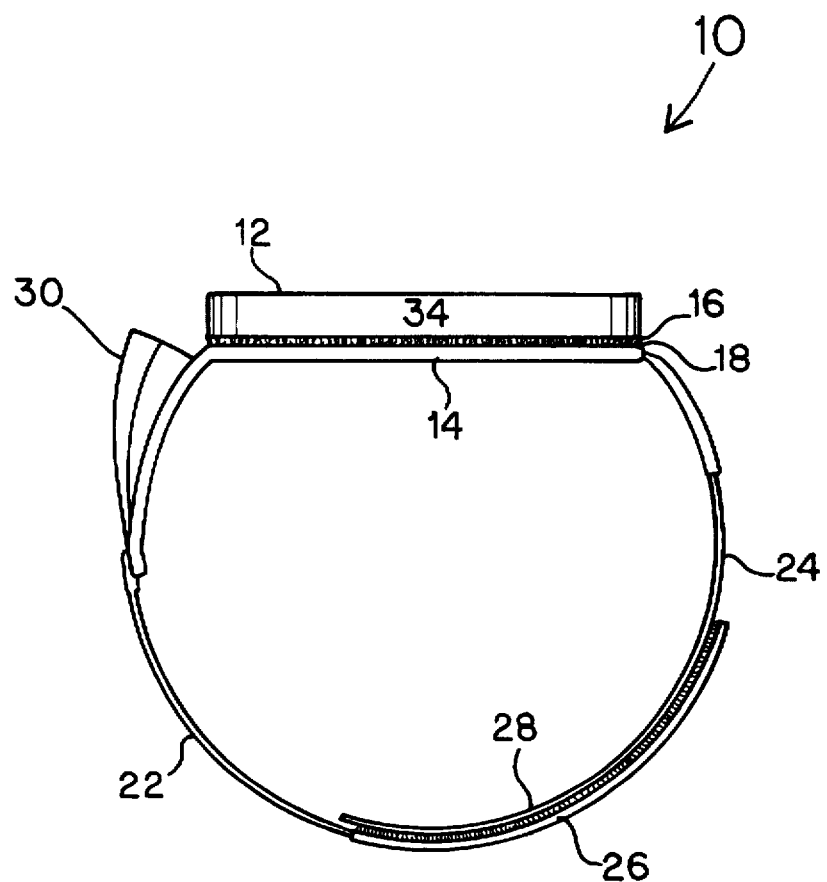
FIG. 2 is a side view of the portable leg-mounted mouse pad.
Figure 3:
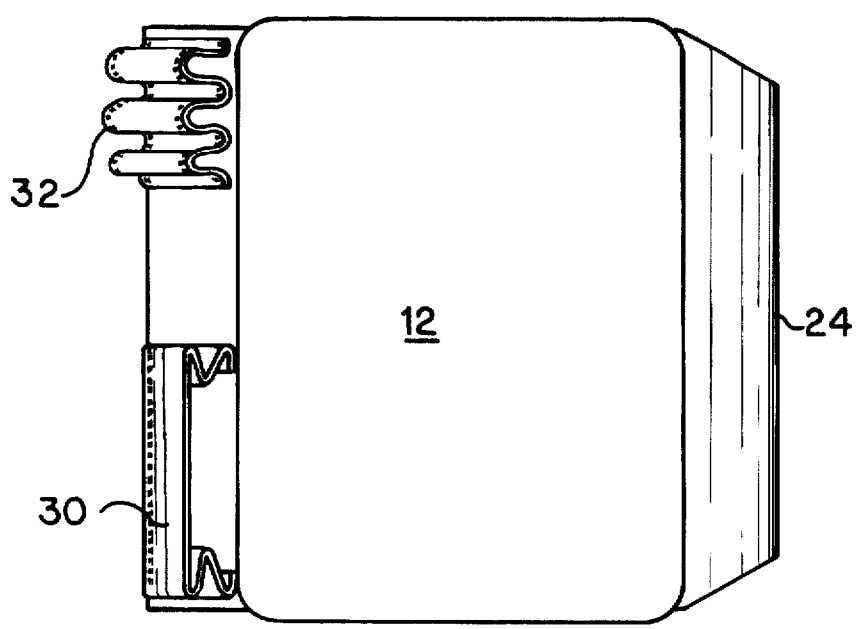
FIG. 3 is a top view of the portable leg-mounted mouse pad.
Figure 4:
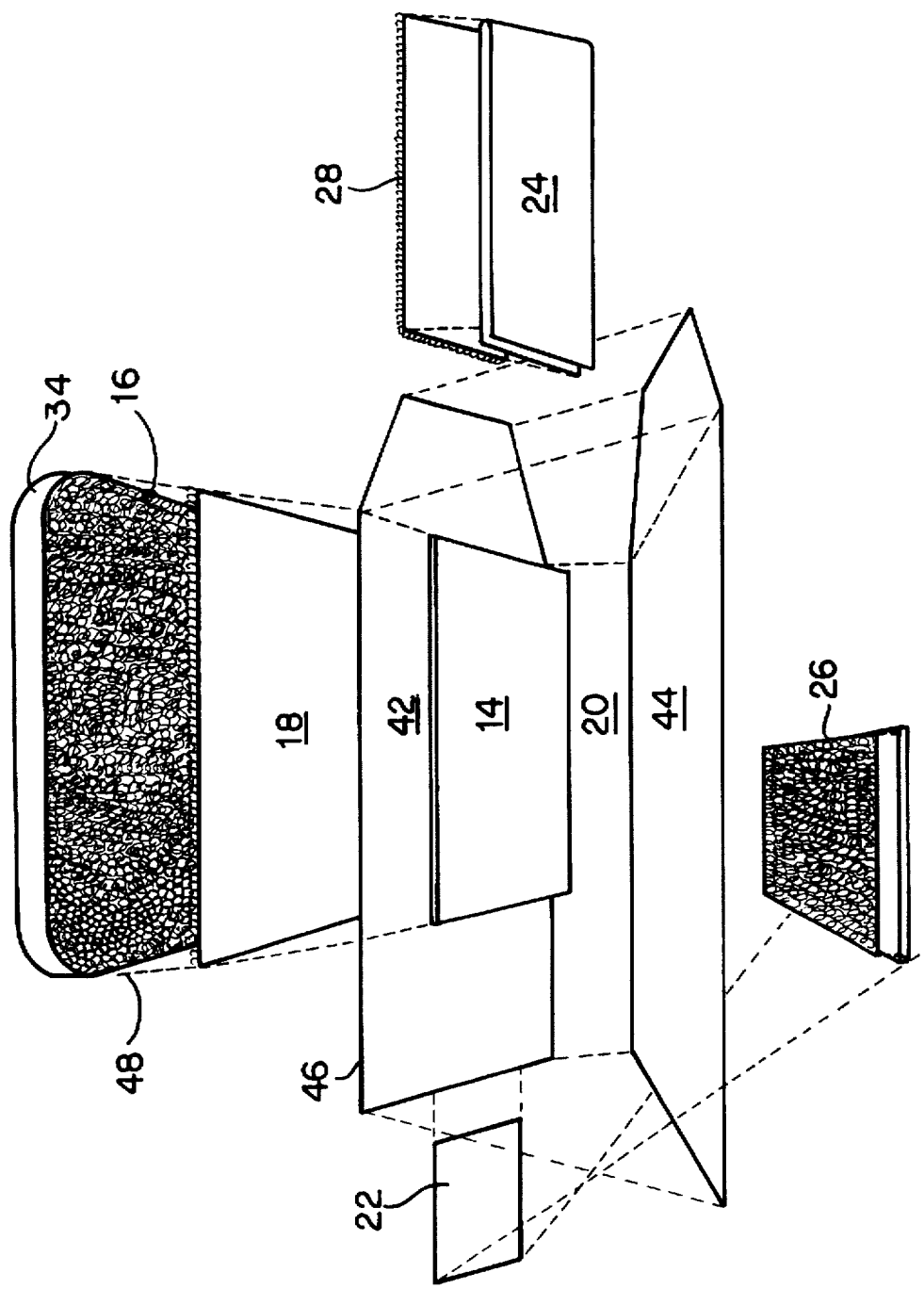
FIG. 4 is an exploded perspective view of the portable leg-mounted mouse pad.

Referring to FIGS. 1 through 4, the invention is shown to advantage. It is to be understood that various modifications, changes, substitution of equivalents and other alterations, can be made without departing from the inventive concept. It is intended that the present invention shall be limited only by the appended claims. As shown in FIG. 1, the portable leg-mounted mouse pad, generally designated as 10, is comprised of a mouse pad 34 with a pad surface 12. The mouse pad 34 in the preferred embodiment is a conventional mouse pad made of a resilient material such as foam rubber, and covered on the top surface by a fabric. Other types of mouse pads can be used, such as thin, hard plastic mouse pads with no underlying foam. Any type of mouse pad can be used. In the preferred configuration of the invention, the mouse pad 34 is approximately six inches in width by nine inches in length, and is approximately one-quarter of an inch thick, made of a foam rubber, covered with a cloth surface. The mouse pad 34 has attached to its underside a means of securing the mouse pad 34 to the portable leg-mounted mouse pad 10. In the Best Mode, this means of attachment is a layer, which can be composed of several pieces or strips of hook or loop fastening material. Loops holding down the corners of the mouse pad 34 can also be used. The bottom side of this hook and loop attachment material forms first attachment surface 16, shown in FIGS. 2 and 4. First attachment surface 16 engages second attachment surface 18, which is a corresponding hook or loop attachment surface. The hook or loop attachment surfaces of second attachment surface 18 are attached to top layer of fabric 42 of the portable leg-mounted mouse pad 10, as shown in FIG. 4.

As most clearly shown in FIG. 2, mouse pad 34 sits atop rigid board 14. Rigid board 14 can be any material which provides a rigid surface for the support of mouse pad 34. Rigid board 14 can be a rectangle of aluminum, plastic, or other material which provides a rigid support. In the Best Mode of this invention, the preferred material for rigid board 14 is plastic. Rigid board 14 is preferably of the same height and width dimensions as mouse pad 34. Rigid board 14 is sandwiched between the top layer of fabric 42 and the bottom layer of fabric 44, as shown in FIG. 4. The pocket formed by the folding and stitching of top layer of fabric 42 and bottom layer of fabric 44 forms pocket 20, which contains rigid board 14. In the preferred embodiment of the invention, rigid board 14 is sewn in place into pocket 20. In another preferred embodiment of the invention, pocket 20 can be closed on three sides, allowing rigid board 14 to be removable from pocket 20. In this embodiment, rigid board 14 could be used for other purposes than merely supporting mouse pad 34. Rigid board 14 in this embodiment could be used as a straight edge, as a note pad, or for other uses.

Board pocket 20 is attached to first elastic strap 22 and second elastic strap 24, as shown in FIGS. 2 and 4. In the preferred embodiment of the invention, only one of the straps is elastic, but in another configuration, both straps could be elastic and still be within the scope of the invention. First elastic strap 22 has at its end first strap attachment surface 26. Second strap 24 has at its end second strap attachment surface 28. As shown in FIGS. 1 and 2, these two surfaces engage each other, enclosing the user's leg 36, and utilize preferably a hook and loop surface for engagement. Other forms of engagement for the two straps could also be used, such as hook and eyelet engagement, buckle engagement or snap engagement. Attached to first elastic strap 22 is mouse pocket 30. Mouse pocket 30 is preferably a fabric pocket with gussets on its sides. As shown in FIGS. 1 and 3, alongside mouse pocket 30 is pen holder 32.

Portable leg-mounted mouse pad 10 can optionally be fitted with strap 38 and hook 40, as shown in FIG. 1, which can attach the portable leg-mounted mouse pad 10 to a user's pocket. In this configuration, if the user is changing positions such as from sitting to standing, and/or walking between position changes, hook 40 hooks over the user's pocket to help prevent portable leg-mounted mouse pad 10 from slipping down the user's leg.

Board pocket 20 is formed by folding a flat sheet of material, such as a fabric, into top layer of fabric 42 and bottom layer of fabric 44. At either end of board pocket 20 are attached a first elastic strap 22 and a second strap 24. At the ends of first elastic strap 22 and second strap 24 is sewn first strap attachment surface 26 and second strap attachment surface 28, which are preferably hook and loop attachment surfaces. On the top side 46 of top layer of fabric 42, is sewn second attachment surface 18, which is preferably a hook or loop attachment surface. To the bottom side 48 of mouse pad 34 is attached first attachment surface 16, which is also a hook or loop surface corresponding with second attachment surface 18. Attached to first attachment surface 16 is mouse pad 34.

In use, the user places the portable leg-mounted mouse pad on his right or left leg, depending upon which hand he uses with a mouse. The first elastic strap 22 is wrapped around his leg, and under tension is joined with second strap 24. The mating surfaces 26 and 28 engage and hold the portable leg-mounted mouse pad 10 in place under tension. In this position, the user may use the mouse from a number of positions; sitting, legs up on desk, reclining on the floor, reclining in a chair, and moving from one position to another, and then resuming mouse or joystick use.

The mouse pad 34 can be removed from the portable leg-mounted mouse pad and placed on the desktop for use as a conventional mouse pad. A joystick or other input device can also be attached to the mouse pad, for use from a number of positions.

While there is shown and described the present preferred embodiment of the invention, it is to be distinctly understood that this invention is not limited thereto but may be variously embodied to practice within the scope of the following claims.

I claim:

1. A portable leg-mounted mouse pad for use with a computer mouse and for attachment to a leg of a computer user, comprising:
   a pad surface with a top surface, which is mounted to a rigid board;
   a means of attaching said pad surface to a rigid board;
   a rigid board to which said pad surface is attached;
   a means of attachment of said rigid board and said pad surface to said leg of a computer user which will hold said portable leg mounted mouse pad in place if said computer user is in a standing, sitting, reclining, feet up, or walking or changing between any position; and
   a pocket built into said portable leg mounted mouse pad for storage of the said mouse.

2. The portable leg-mounted mouse pad of claim 1 in which the means of attachment of said rigid board and said pad surface to said leg of a computer user is a plurality of straps.

3. The portable leg-mounted mouse pad of claim 2 in which said strap further comprises a first and a second strap section each with a first end and a second end, with a means of securing an end of said first strap section and an end of said second strap section to each other.

4. The portable leg-mounted mouse pad of claim 1 which further comprises a means of mounting an input device other than a mouse, such as a joystick.

5. The portable leg mounted mouse pad of claim 1 which further comprises a rigid board which is removable from the portable leg mounted mouse pad.

6. The portable leg-mounted mouse pad of claim 1 in which the pad surface is removable and may be used as a conventional desktop mouse pad.

7. The portable leg mounted mouse pad of claim 1 which further comprises a means of storing a plurality of writing tools.

8. The portable leg-mounted mouse pad of claim 1 in which the means of attachment to said leg of a computer user includes a means of preventing said leg mounted mouse pad from slipping down said leg of said computer user.

9. The portable leg-mounted mouse pad of claim 8 in which the means of preventing slipping is a friction device.

10. The portable leg mounted mouse pad of claim 8 in which the means attachment which prevents said leg mounted mouse pad from slipping down said leg of a computer user is a device which engages a pocket, belt, or clothing of said user.

11. The portable leg-mounted pad of claim 10 which further comprises a hook for engagement with a pocket, belt, or clothing of said user.

12. A portable leg-mounted mouse pad for use with a computer mouse and a computer which may be placed on a desktop, and for attachment to a leg of a computer user, comprising:
    a pad surface with a top surface which serves as a mouse engaging surface and which is lower than said desktop, and which is mounted to a rigid board;
    a means of attaching said pad surface to a rigid board;
    a rigid board to which said pad surface is attached;
    a first strap with a first end and a second end which is connected to said rigid board and said pad surface at its first end;
    a second strap with a first end and a second end which is connected to said rigid board and pad surface at its first end;
    a pocket for storing a computer mouse; and
    a means of attaching said second end of said first strap with said second end of said second strap so that said first and second straps encircle said leg of said computer user and hold said portable leg mounted mouse pad in place on said leg of said computer user if said computer user is in any position, including sitting, standing, reclining, feet up, walking or changing between any position.

13. The portable leg-mounted mouse pad of claim 12 in which the means of attachment to said leg of said computer user includes a means of preventing said leg mounted mouse pad from slipping down said leg of said computer user.

14. The portable leg-mounted mouse pad of claim 13 in which the means of preventing slipping is a friction device.

15. The portable leg-mounted mouse pad of claim 13 in which the means of attachment which prevents said leg mounted mouse pad from slipping down said leg of said user is a hook which engages a pocket, belt, or clothing of the computer user.

16. The portable leg-mounted mouse pad of claim 12 in which the pad surface is removable and may be used as a conventional desktop mouse pad.

17. The portable leg-mounted mouse pad of claim 12 which further comprises a means of mounting an input device other than a mouse, such as a joystick.

* * * * *